United States Patent [19]
Piotrowski et al.

[11] Patent Number: 5,231,164
[45] Date of Patent: Jul. 27, 1993

[54] REMOVAL OF CATALYST RESIDUE FROM POLYKETONE SOLUTION WITH SILICA GEL OR METAL OXIDE CONTAINING WATER OR HYDROXYL FUNCTIONALITY

[75] Inventors: Andrzej M. Piotrowski, Peekskill, N.Y.; Paul K. Hanna, East Windsor, N.J.

[73] Assignee: Akzo N.V., Arnhem, Netherlands

[21] Appl. No.: 842,785

[22] Filed: Feb. 26, 1992

Related U.S. Application Data

[63] Continuation of Ser. No. 595,070, Oct. 10, 1990, abandoned.

[51] Int. Cl.$^5$ .............................................. C08G 67/02
[52] U.S. Cl. .................................. 528/485; 528/392; 528/482; 528/490
[58] Field of Search ................ 528/485, 490, 482, 392

[56] References Cited

U.S. PATENT DOCUMENTS

| | | | |
|---|---|---|---|
| 2,666,756 | 1/1954 | Boyd et al. | 528/392 |
| 4,786,716 | 11/1988 | Van Broekhoven et al. | 528/487 |
| 4,870,156 | 9/1989 | Pino et al. | 528/487 |

*Primary Examiner*—Harold D. Anderson
*Attorney, Agent, or Firm*—Richard P. Fennelly; Louis A. Morris

[57] ABSTRACT

Catalyst residue (e.g., trace Group VIII metal) is removed from a polyketone solution, and from the polyketone resin itself, by passing the solution through a column comprising a metal oxide (e.g., silica gel) which is effective in removing the residue therefrom or by mixing the polyketone solution with particulate metal oxide.

7 Claims, No Drawings

REMOVAL OF CATALYST RESIDUE FROM POLYKETONE SOLUTION WITH SILICA GEL OR METAL OXIDE CONTAINING WATER OR HYDROXYL FUNCTIONALITY

This is a continuation of application Ser. No. 595,070 filed Oct. 10, 1990, now abandoned.

BACKGROUND OF THE INVENTION

A variety of techniques have been proposed for the removal of catalyst residue from generally organic solvent-insoluble linear alternating polymers of carbon monoxide and at least one ethylenically unsaturated hydrocarbons. The presence of the metal moiety from the catalyst (e.g., Pd or Ni renders them incapable of withstanding high temperatures required during certain polymer processing operations without discoloration and/or decomposition from occurring. Examples of such techniques include:

1. treatment of the polymer with a suitable complexing agent such as a triaryl phosphine, trialkyl amine or certain phosphorus, arsenic, antimony or nitrogen compound (see Eur. Pat. Publ. No. 285,218);

2. treatment of the polymer with a triaryl phosphine, trialkyl amine, or metal or ammonium salt of a $C_1$-$C_8$ carboxylic acid complexing agent (see Eur. Pat. Publ. No. 283,092);

3. treatment of the polymers with carbon monoxide at elevated temperature in suspension in an organic media (see Eur. Pat. Publ. No. 224,304);

4. treatment of the polymer with a dithiocarbamate compound in a non-gaseous reaction environment in an oxygenated organic reaction diluent (see U.S. Pat. No. 4,870,156); and 5. treatment of the polymer with a certain bidentate phosphine ligand (see U.S. Pat. No. 4,786,716). Each of the foregoing are incorporated herein by reference for their teaching of synthesis of polyketone materials containing the undesired catalyst residue.

SUMMARY OF THE INVENTION

The present invention is a process for the removal of catalyst residues from polyketone materials which are generally soluble in organic solvent, such as those described below. The present invention comprises a process for the removal of catalyst residue from a polyketone solution which comprises treating the solution with a metal oxide which is effective in removing the catalyst residue from the solution and polyketone contained therein.

DETAILED DESCRIPTION OF THE INVENTION

The polyketone materials which are treated in accordance with the present invention are copolymers of carbon monoxide and at least one other olefin which are soluble in organic solvent. Examples include copolymers of carbon monoxide, a second olefin, other than ethylene and terpolymers of carbon monoxide, propylene and another copolymerizable olefin. Included are the novel carbon monoxide/propylene copolymers described and claimed in the application entitled "Copolymer of Carbon Monoxide and Propylene and Process for Its Formation" U.S. Ser. No. 595,069, filed on Oct. 10, 1990. These polyketone materials are synthesized in a ketonic solvent by using a Group VIII transition metal compound or complex as a catalyst as further described in the patent documents mentioned hereinabove which are incorporated herein for their teachings of how such materials might be synthesized.

Solutions containing the polyketone materials and also containing undesired catalyst residue (e.g., trace Group VIII metal) can be purified by the instant invention. The process of purification, in its broadest embodiment, involves treating the solution containing the polyketone with a metal oxide which is effective in removing the catalyst residue from the solution and from the polyketone contained therein. The metal oxide material used should not be either too acidic or too basic in order to preclude chemical reaction and alteration of the polyketone structure. Essentially neutral metal oxides, such as silica gel and alumina gel, which contain some water or hydroxy functionality are preferred. Molecular sieve resins or zeolites (e.g., crystalline aluminosilicate materials) are also deemed to be useful.

The metal oxide can be in the form of a particulate solid and can be combined with the polyketone solution and agitated with it. Alternatively, the metal oxide can be in the form of a monolith (e.g., a column) through which the solution containing the polyketone is passed.

The instant invention is further illustrated by the Examples which follow.

EXAMPLE 1

A bright yellow solution of 240 gm of carbon monoxide/propylene copolymer in 2000 mL of acetone (as removed from the autoclave) was passed through a silica gel column (silica bed: 5 cm in diameter and about 15 cm long) over a period of 1 hour. The eluant was pale yellow.

The solid polymer isolated from the acetone solution before the column purification was gray. The polymer isolated from the acetone solution after the column purification was colorless.

EXAMPLE 2

A bright yellow solution of 240 gm of carbon monoxide/propylene copolymer in 2000 mL of acetone (as removed from the autoclave) was condensed under vacuum to contain about 500 mL acetone. The solution was then diluted with methylene chloride to 2000 mL and was passed through a silica gel column as in Example 1. A sample of the solid polymer separated from the solution before the column purification contained 49 ppm Pd. After the column purification, this dropped to 17 ppm of Pd in the solid polymer.

COMPARATIVE EXAMPLE 3

This Example illustrates that the column purification technique of this invention should be performed as soon as practical after the polymer solution has been formed.

A bright yellow solution of 24 gm of carbon monoxide/propylene copolymer in 250 mL of acetone (part of the product removed from the autoclave) was stored for a period of 4 days. After the storage period, the solution was orange in color.

When it was passed through the silica gel column as in Examples 1-2, no significant color change was observed. The polymer separated after the column purification was bright yellow.

EXAMPLES 4-5

Two solutions of 0.1 gm of carbon monoxide/propylene copolymer in 10 ml. of acetone were prepared. Both solutions were light yellow in color. One was allowed to stand for eighteen hours. This solution turned brown. To the other solution was added 0.1 gm of silica gel. After allowing this solution to stand for eighteen hours, there was no observable color change.

EXAMPLES 6-7

Two other solutions of 0.1 gm of carbon monoxide/propylene copolymer in 10 ml. of methylene chloride were prepared. One solution was allowed to stand for eighteen hours. This solution turned brown. To the other solution was added 0.1 gm of silica gel. After allowing this solution to stand for eighteen hours, there was only a slight darkening of its color.

The foregoing Examples are presented for illustrative purposes and should not, therefore, be construed in a limiting sense. The scope of protection is set forth in the claims which follow.

We claim:

1. A process for the removal of catalyst residue, comprising a transition metal compound or complex, from a solution comprising a polyketone which comprises treating the solution with silica gel or a metal oxide containing water or hydroxy functionality which is effective in removing the catalyst residue therefrom.

2. A process as claimed in claim 1 wherein the metal oxide containing water or hydroxy functionality is alumina gel.

3. A process as claimed in claim 1 wherein the metal oxide containing water or hydroxy functionality is a molecular sieve resin.

4. A process as claimed in claim 1 wherein the silica gel or metal oxide containing water or hydroxy functionality is in particulate form.

5. A process as claimed in claim 1 wherein the silica gel or metal oxide containing water or hydroxy functionality is in the form of a column.

6. A process as claimed in claim 1 wherein the silica gel or metal oxide containing water or hydroxy functionality is in particulate form.

7. A process as claimed in claim 1 wherein the silica gel or metal oxide containing water or hydroxy functionality is in the form of a column.

* * * * *